Oct. 14, 1958 A. ZAHA 2,856,081
VEHICLE PARKING MEANS
Filed Oct. 22, 1953 7 Sheets-Sheet 1
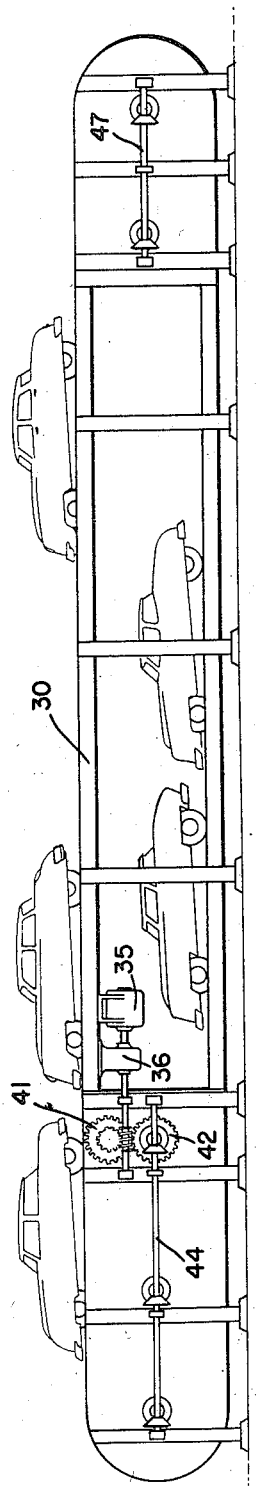
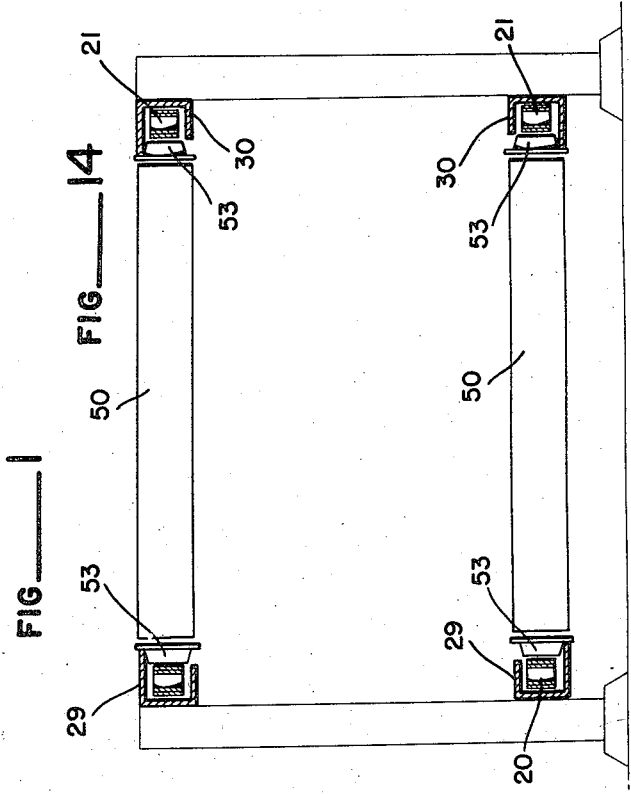
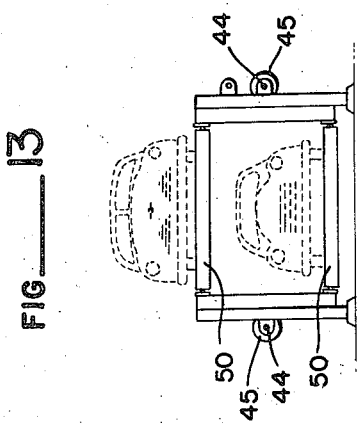
ABE ZAHA
INVENTOR.
BY *Smith & Tuck*

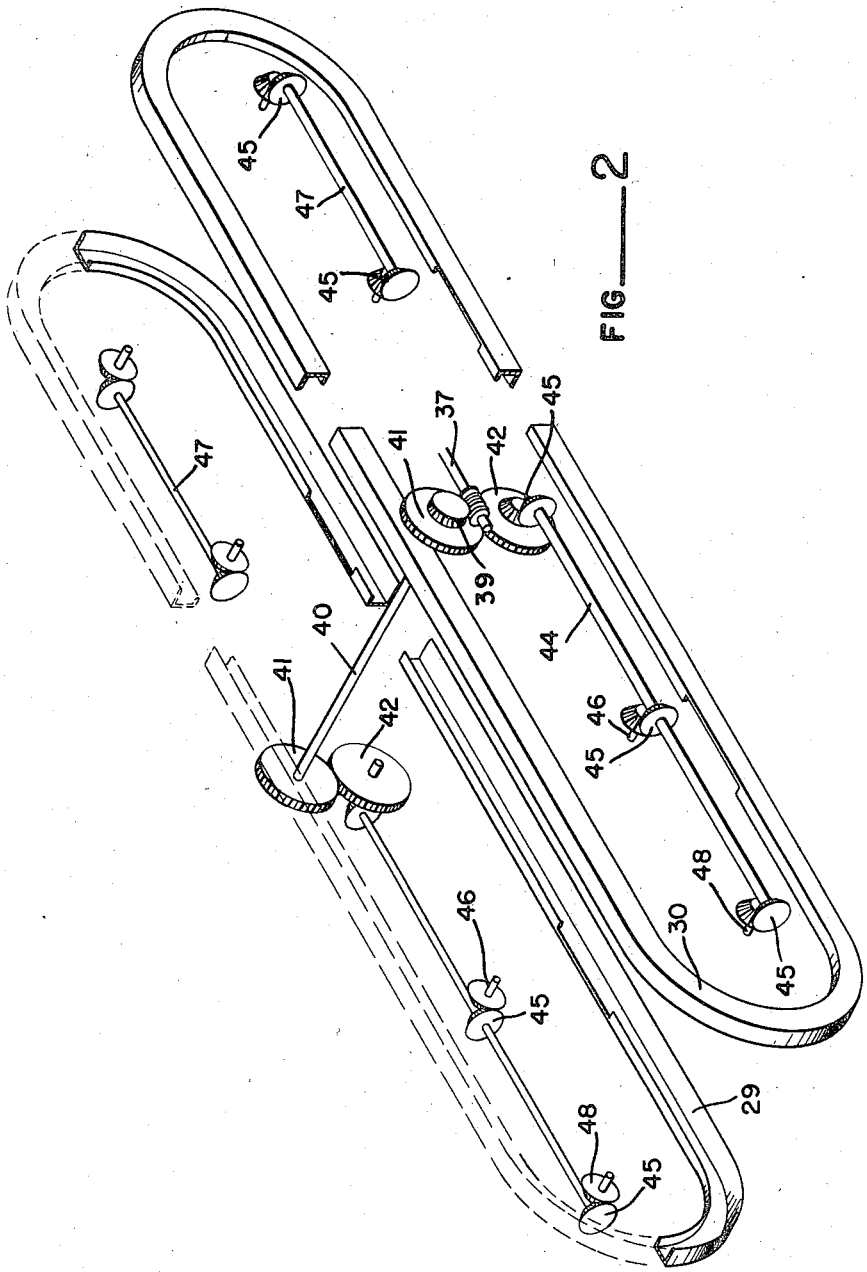

Oct. 14, 1958
A. ZAHA
2,856,081
VEHICLE PARKING MEANS
Filed Oct. 22, 1953
7 Sheets-Sheet 3
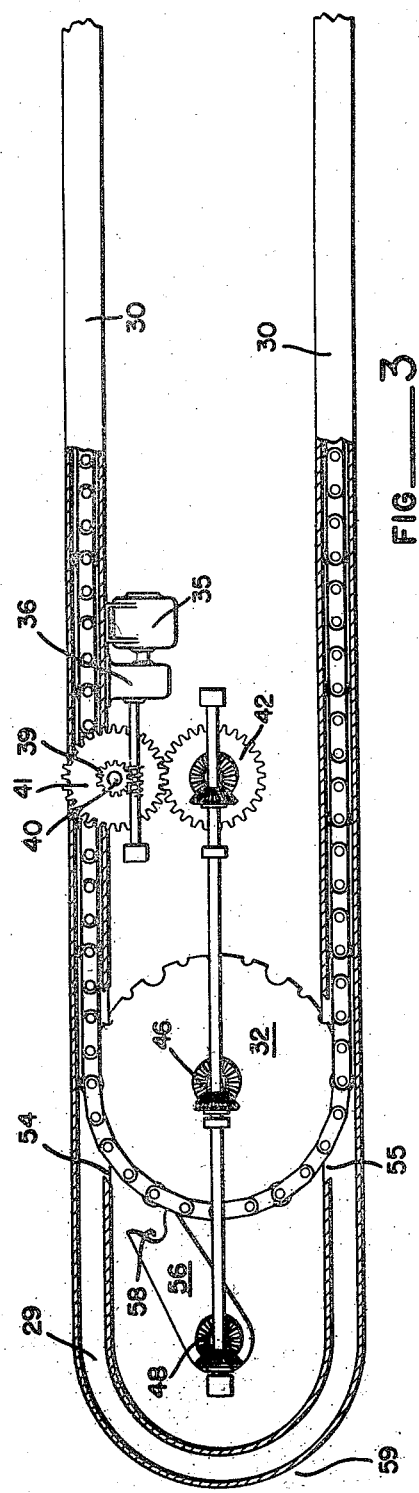
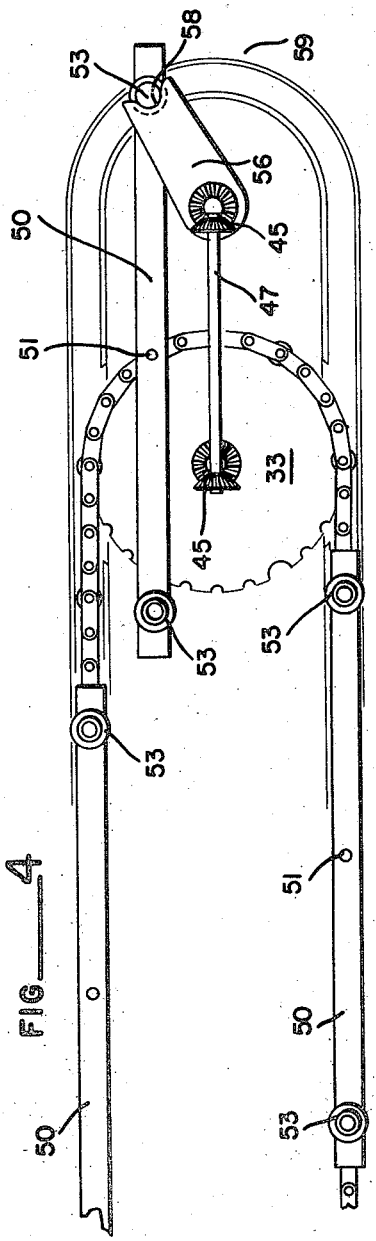
ABE ZAHA
*INVENTOR.*
BY *Smith & Tuck*

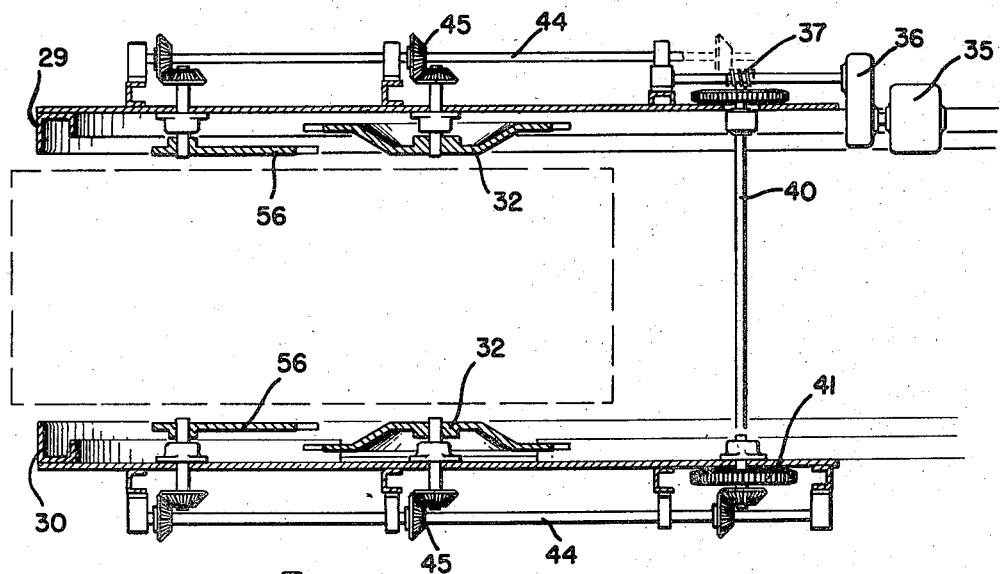
FIG. 5
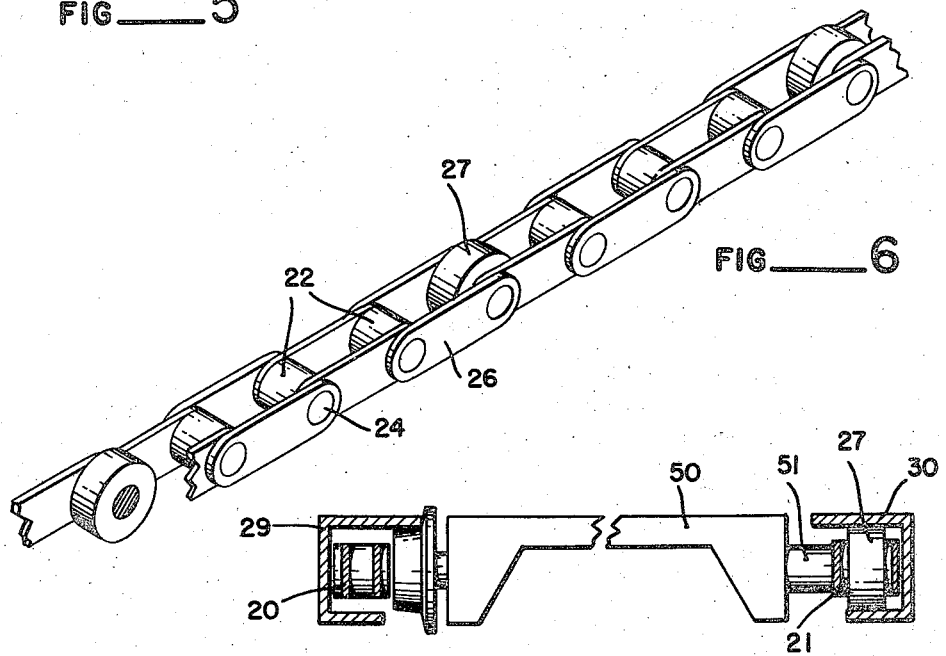
FIG. 6
FIG. 7
ABE ZAHA
*INVENTOR.*
BY Smith & Tuck

Oct. 14, 1958     A. ZAHA     2,856,081
VEHICLE PARKING MEANS
Filed Oct. 22, 1953     7 Sheets-Sheet 5
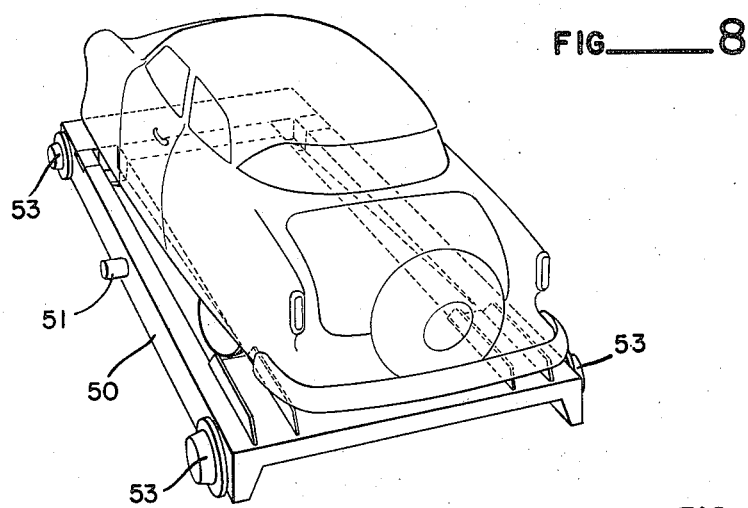
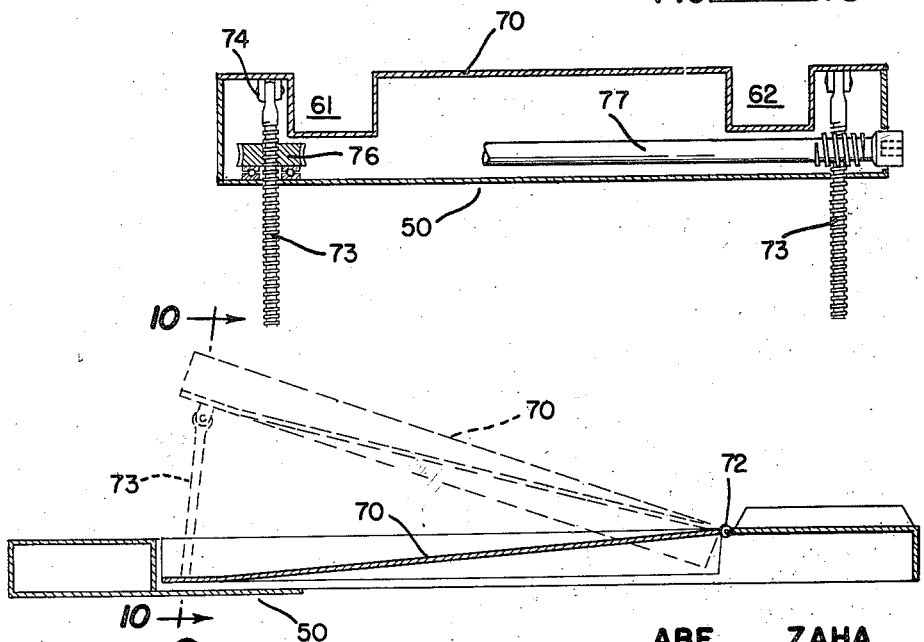
ABE ZAHA
*INVENTOR.*
BY Smith & Tuck Oct. 14, 1958
A. ZAHA
2,856,081
VEHICLE PARKING MEANS
Filed Oct. 22, 1953
7 Sheets-Sheet 6
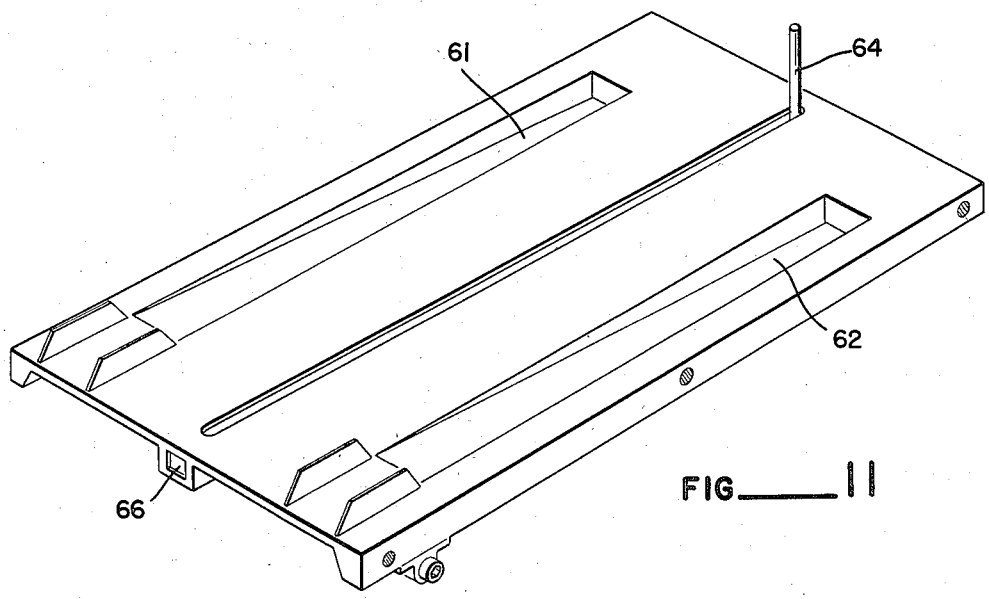
FIG. 11
FIG. 12
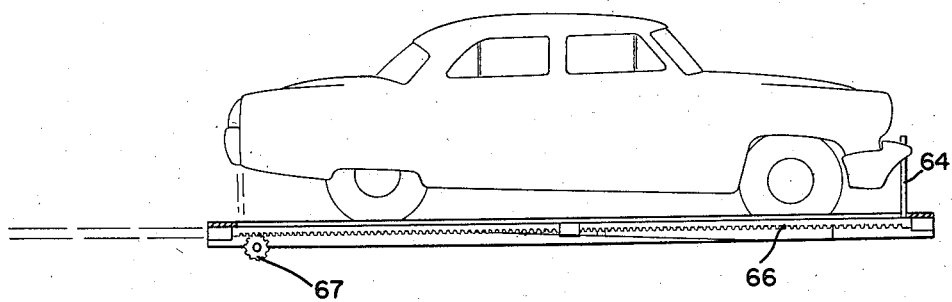
ABE ZAHA
*INVENTOR.*
BY
*Smith & Tuck*

Oct. 14, 1958  A. ZAHA  2,856,081
VEHICLE PARKING MEANS
Filed Oct. 22, 1953
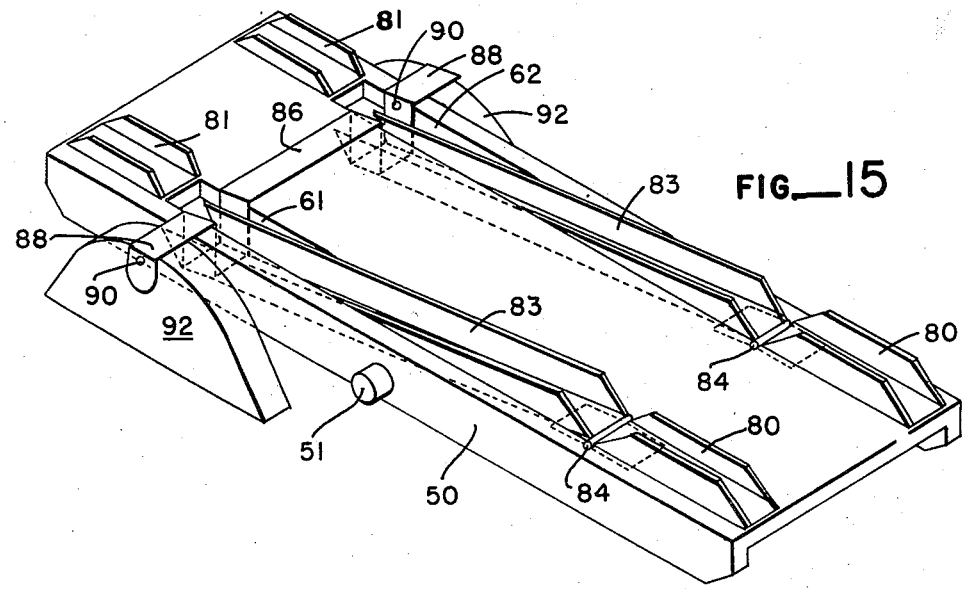
FIG.—15
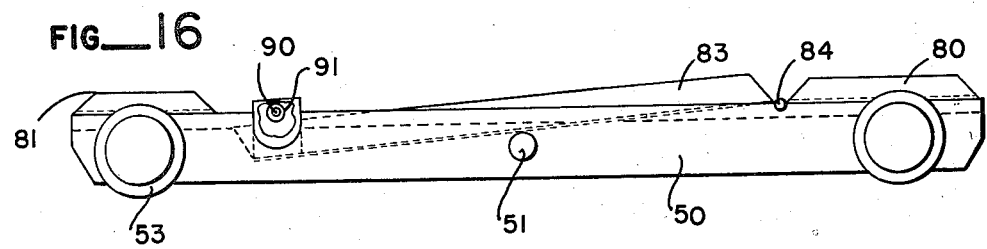
FIG.—16
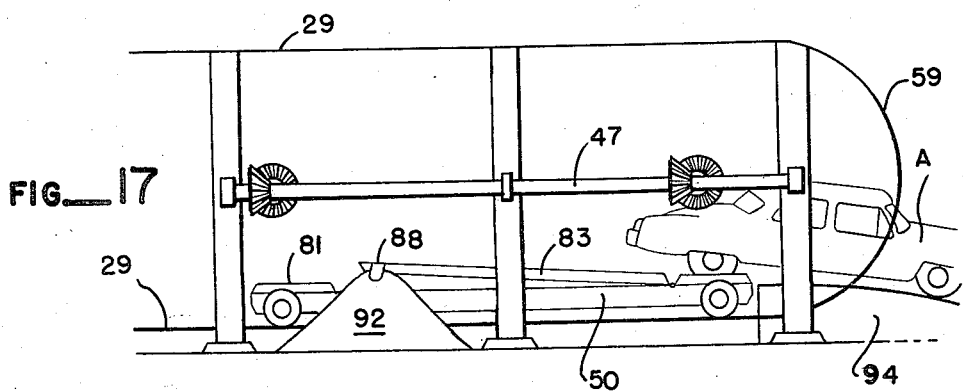
FIG.—17
ABE ZAHA
*INVENTOR.*
BY *Smith & Tuck*

United States Patent Office 2,856,081
Patented Oct. 14, 1958

2,856,081

VEHICLE PARKING MEANS

Abe Zaha, Pendleton, Oreg.

Application October 22, 1953, Serial No. 387,613

9 Claims. (Cl. 214—16.1)

This present invention is a means for compactly parking vehicles and is characterized by features which permit the selective delivery of any one of a plurality of vehicles parked on the unit. Considering one basic unit of this parking device it can be considered as two parallel chain assemblies which are disposed in spaced relationship to each other with each of the chain assemblies disposed in a vertical plane. Chain engaging, positioning and driving sprockets are provided at each end of the assembly and the diameter of the sprockets should be sufficient so that a row of parked cars can be contained in the space between the two chain assemblies and the vertical spacing of the upper deck from the lower deck must provide ample clearance for the movement of the lower vehicles. It thus follows that this basic unit, in effect, parks two rows of cars, one immediately above the other with little, if any, vertical distance being wasted and in end to end relationship the cars are parked just as closely together as the length of the longest cars will permit. Each car rests upon an individually pivoted platform which may pass entirely around the circuit provided by the two spaced chains and means are provided for passing the cars around the sprockets at each end of the device.

The concentration of population in manufacturing, industrial and business centers has created a major parking problem, particularly for automoblies. Unfortunately people tend to congregate in areas and that causes land values in those areas to be greatly appreciated. As a result the old common methods of storing cars in garages and in parking lots is too wasteful of the high priced ground space to make the same feasible. It therefore follows that a great deal of study has gone into the provision of off-the-street parking and while many of these solutions provided by the numerous inventors and designers tend to solve the problem to a degree there is still considerable wasted space and the cost per car unit is so high as to make such plans unacceptable except under the most urgent conditions. In this present invention, it is believed, that many of the deficiencies of the equipment previously designed or built has been overcome.

The principal object of this present invention therefore is to provide a parking arrangement, especially for vehicles in which the very minimum of cubicle space is employed in the parking of a vehicle.

A further object of this invention is to provide a vehicle storage arrangement that is capable of being constructed at a very low cost per car unit basis and which at the same time will have a wide application to varying circumstances and conditions.

A further object of this invention is to provide a storage arrangement in which vehicles or other items may be stored by the movement of the conveyor system on an automatic basis and which when the stored item is desired can be recovered at the point of delivery by devices which easily admit of automatic control.

A further object of this invention, therefore is to provide a storage arrangement that can be largely consumer or user operated so that the operational overhead is reduced to a minimum.

A further object of this invention is to provide a multiple storage unit which is of compact, light design, where the motive power required to drive the storage unit is merely that which required to move the stored items along a conveyer system, normally horizontally disposed, and which does not require tremendous power such as characterizes so many of the elevator or bucket type storage units.

A further object of this invention is to provide a storage arrangement which in addition to parking automobiles might be employed for the storage and dispensing of airplanes or might be employed in houses and stock rooms or the like, for the storage of packaged goods wherever it is desirable to conserve space and at the same time make the delivery of selected items a convenient and expeditious one.

A further object of this invention is to provide means in which automobiles are stored on streets, on alleys, or on lots where it is desired to multiply the number of vehicles that can be stored on a given ground area.

Further objects, advantages and capabilities will be apparent from the description and disclosure in the drawings, or may be comprehended or are inherent in the device.

In the drawings:

Figure 1 is a side elevation of a basic unit of this present storage device;

Figure 2 is a perspective view illustrating some of the design features of this equipment, the view being diagrammatic in character with certain parts broken away and others illustrated in dashed lines;

Figure 3 is a fragmentary vertical elevation, partly in section, showing the driving end of this storage arrangement;

Figure 4 is a fragmentary view in elevation showing the opposite end of the device of Figure 3;

Figure 5 is a horizontal sectional view illustrating the drive means employed in this present device and showing the same in relationship to a storage platform which is illustrated in dashed lines;

Figure 6 is a perspective view illustrating one form of chain found desirable in this device to serve as the conveying medium;

Figure 7 is a broken cross-sectional view illustrating the means employed for imparting conveying force and the pivot means positioned at the balance point of the car of package carrying platforms;

Figure 8 is a perspective view illustrating a car carrying platform and illustrating the manner in which an automobile is carried thereupon;

Figure 9 is a vertical sectional view taken longitudinally through the car carrying platform of Figure 8 illustrating, in dashed lines, the extreme angular position of the car carrier proper showing the adaptability of this equipment to sloping ground areas;

Figure 10 is a cross-sectional view taken from dashed lines 10—10 of Figure 9 and illustrating one form of drive means to effect the adjustable positioning of car carrying platform;

Figure 11 is a perspective view showing the upper surface of the tiltable platform of Figure 9;

Figure 12 is a side elevation, partly in section, illustrating a car stop and unloading means used with the platform of Figures 9 and 11;

Figure 13 is an end elevation of Figure 1;

Figure 14 is a typical transverse section, in elevation, through the device of Figure 1;

Figure 15 is a perspective view illustrating a car positioning and unloading ramp for use on the car operating cradles;

Figure 16 is a side elevation of the cradle assembly of Figure 15, a portion being broken away to better illustrate the construction; and Figure 17 is a diagrammatic view showing in elevation the manner in which an automobile is unloaded.

Referring more particularly to the disclosure in the drawings, the numerals 20 and 21 designate respectively the two main conveyer chains which provide the motive power for moving the cars or stored merchandise around the circuit of the storage device. These chains may take a variety of forms for different purposes. In the storage of vehicles, however, the form shown in Figure 6 has proved quite satisfactory in which a plurality of small diameter rollers, as 22, are mounted upon suitable pins, as 24, and connected by link side bar members 26. At spaced intervals throughout the length of the chain are disposed larger diameter rollers, as 27. These rollers are preferably used where attachments are required and further substantially fill the runways provided in the channel members 29 and 30. Chains 20 and 21 are engaged respectively by the drive sprockets 32 and the idler sprockets 33 disposed at the opposite end of the device. Sprockets 32 and 33 are of a diameter so as to give a vertical spacing to the two runs of the chains which will provide adequate vertical clearance so that automobiles carried on the lower run of chains will have ample clearance below the carriages carrying cars on the upper runs of the chains.

In its simplest form, this device consists of two spaced chains 20 and 21 which are spaced, transversely, sufficiently apart that a row of cars may be carried on the lower run of chains and within the supporting framework and guide channels for the chains. A typical illustration is shown in Figures 1, 13 and 14.

A study of Figures 2, 3 and 4 will give a general understanding of the manner in which the chains are driven, guided, and supported.

The drive and supporting means for sprockets 32 and 33 must be contained fully within the general framework provided by each set of channels 29 and 30 or extend outside of the same so as not to interfere with the free passage of the lower run of cars. This means that the sprockets on either side of the conveyer system cannot have a common shaft but must be individually supported. A convenient drive is shown in Figures 2 to 5 inclusive, in which a suitable source of power, as the electric motor 35, is employed with one motor serving as the drive means for the two spaced conveyer chains, this is to insure that they will be driven at the same speed. Normally an electric motor is provided with the reduction drive gear 36 and from this drive a worm 37 and its supporting shaft drives the worm gear 39. Gear 39 is fixedly secured to a cross shaft 40 and it is to be noted particularly in Figures 2 and 3 that shaft 40 is disposed at sufficient height so that cars can pass underneath the same without interference. Fixedly secured to shaft 40 are transfer gears, one pair for each chain, 41 and 42. A preferred arrangement is to have the pitch diameters of gears 41 and 42 such that a single power shaft 44 may be employed which by suitable beveled gearing, as 45, can accept the driving power from motor 35 and transfer it to the sprocket drive shaft 46 and the transverse stub shaft 48.

To facilitate the transportation of cars and the like by chains 20 and 21, conveyer cradles or platforms 50 are provided, one for each automobile. A general view of cradle 50 is shown in Figure 8 with further details available in Figures 7, 9, 10, 11 and 12. Cradles 50 are provided with oppositely disposed and outwardly extending pivot trunnions 51. These trunnions are secured to chains 20 and 21 at the points where the large rollers 27 occur. This assembly should have sufficient strength so that the two trunnions can carry the entire weight of the car and the cradle together with its associated parts.

In order to provide a stable balance against longitudinal tipping of cradle 50, outwardly extending axles are provided at each end of the cradle to which are revolvably secured the preferably flanged wheels 53. These wheels engage the under surface of inwardly extending channel members 29 and 30, after the fashion shown in Figure 7. When the cradle however passes around the end or during the loading operation, the flanged wheels engage the inwardly extending flanges of members 29 and 30 which will then be on the lower side of these members, the engagement of the wheels being with the upper surface of this inwardly extending flange. Such an arrangement provides a very stable positioning of the cradle throughout all of its lineal movement. However, it is to be noted in Figure 3 particularly that channel members 29 and 30 are cut away at 54 and 55 so that the chains may continue around the sprockets 32 and 33. The trunnions 51 of course are secured to the chains and as the cradle progresses beyond the endwise extent of the chains, the inboard flanged wheels 53 lose the guiding of channels 29 and 30 and the outboard wheels 53 on the sides of the cradle are engaged by levers 56. These levers have what is in effect a pair of sprocket teeth with the roller engaging recess 58 between them. These engage the wheels 53 which are still under the guiding influence of the curved portion 59 of channels 29 and 30 and thus when suitably driven levers 56 hold cradles 50 in a horizontal position while making the end transverse from the bottom to the upper run of the chains or vice versa.

To insure proper timing of arms 56, the same are driven by beveled gear assemblies 45 respectively, from the shafts supporting sprockets 32 and 33. The driven, or idler, sprocket 33 of course is accurately timed by chains 20 and 21, and transfer shafts 47, whereas at the power end levers 56 are connected by gearing directly to the power shaft 46. Figure 5 illustrates this drive quite effectively. It is to be noted that while the inboard set of flange wheels 53 are not employed at one end of the storage device, when the transfer is made at the other end, they become the operative wheels.

Equipment of this order normally will function smoothly on level ground. However, quite often it is necessary to install this equipment on ground that is sloping. This is particularly true in the case where alley or park-strip parking is employed. In these instances, the equipment of this invention must be adjusted to the slope of the ground on which it is operating. In viewing Figure 1 it is to be noted that the front wheels of the various cars are all at a lower level than the rear. This would accommodate the use of this equipment on a slope where the lefthand end of the device is considerably higher than the righthand end. For moderately sloping ground, it would be sufficient to merely have track recesses as 61 and 62 and these could be formed as part of the cradle assembly. With such an arrangement it would be desirable in many instances to have means to move the cars back up the inclines produced by pockets 61 and 62 and to this end I have illustrated a bumper-engaging stop member 64 which is fixed to, and under control of the gear rack 66. This rack in turn is movable by gear 67 and in this way stop members 64 can be moved sufficiently to the left as viewed in Figures 11 and 12 to move the car out of the car parkway.

In many instances however where steep slopes are encountered it is necessary to take care of greater angularity than the device of Figure 11 can provide and to meet these needs I have shown the structure of Figures 9 and 10. Here the car cradle 50 is provided with an upper deck 70 having in it the wheel pockets as 61 and 62. This upper deck is normally made generally after the showing of Figure 11 and is provided at one end with a hinged pivot 72 and at the other end with elevating means. One convenient means is the adoption of the jack principle in which a long threaded shaft as 73 is pivotably secured as at 74 to deck 70. Elevation is secured by turning the threaded nut 76 which may be conveniently formed as a worm gear so that a common shaft 77 may be revolved so that each screw is turned in the same direction and will be revolved the same amount. This would enable the extreme pivoting of deck 70 after the showing of Figure 9 and thus very steep slopes could easily be taken care of. It is generally considered that the dotted line position of Figure 9 would be close to the horizontal with the entire device, including the transportation chains and their supporting channels 29 and 30 being disposed on an incline. The car would rest on deck 70 much like a person standing on the hinged steps of an escalator.

*Method of operation*

Equipment of this order lends itself to both manual and automatic control. In keeping, however, with one of the general objects of this invention, it is very desirable that the attending personnel be reduced to the minimum and an interlocking, preferably coin-controlled electric system, most fully serves the purposes of this invention. Such equipment is however well developed and suitable control mechanisms can easily be adapted to this present equipment.

In general to load a series of cars on to this equipment a loading driveway or ramp needs to be constructed so that a car can be delivered or taken off platform 70 forming part of the car cradle, but this might be either on the upper run or the lower run of the conveyor system, depending upon terrain conditions at the particular installation. A preferred arrangement is for the landing stage to be substantially horizontal and then the cars run on to the platform. The owner of the car of course can personally lock his car as he leaves it, not setting his brakes, and with the wheels engaging the downwardly inclined wheel grooves 61 and 62 the car will normally run forward until the wheels abut the end of the pockets. In the case, however, of small cars, stop member 64 can be adjusted so that it will engage the bumper in a manner to put the center of mass on the car substantially over trunnions 51. When the car comes to rest on deck 70, the conveyor is moved one car length. That will bring a new car cradle 50 in position, it being understood that each car cradle is a complete assembly or platform which will accommodate one car.

When the driver desires to obtain this automobile, the conveyer is moved, under manual control or under electrical control, which may be coin controlled to the point at which the car was received. The car which has normally gone around the conveyor circuit would not have its brakes set although the car itself was otherwise locked and when the discharge point is reached, the car is moved off of the deck 70 of cradle 50, either by movement of stop 64 to the left as viewed in Figures 11 and 12 or by tilting of the entire deck by the mechanism illustrated in Figures 9 and 10. The selection between these two forms of operation would depend to a large degree upon the terrain upon which the equipment is installed and in all installations of this order safety provisions to protect individuals will normally be provided in keeping with the conditions that attend the installation of the equipment.

Throughout this entire specification it has been endeavored to reduce the invention to its simplest form; only one basic unit, that of vertically disposed but horizontally spaced, chain assemblies has been illustrated and been described. It would be readily apparent of course that to make use of a parking lot area that a plurality of these units would generally be installed side by side. It further follows that these units may be superimposed one on the other, in which case transfer units similar to the present, might be disposed transversely at one end of the unit and cars could be taken on to them, and from there transferred to any one of a plurality of the parking units. This equipment in multi-storage arrangement can be very conveniently served by any one of the various approved elevator designs which would bring the cars up to the point where they could be loaded on the particular level desired. The same elevator arrangement would serve to deliver the cars when they are desired.

Due to the wide range of locations, however, and the possibility of employing hillside areas where entrance can be had at various levels, there are many possible and different ways in which this equipment can be profitably employed.

In order to have a commercially practical device, the parking assembly should support a minimum of eight automobiles and would commonly support more than the number. As a minimum, therefore, the upper and lower runs of conveyor chains 20, 21 should each be at least four car lengths. To avoid unnecessary materials in the sprocket wheels 32 and the other supporting structure and to minimize the height of the structure when one assembly is positioned above the other, the upper and lower runs of conveyer chains 20, 21 should be spaced apart a maximum of two sedan automobile heights.

In Figures 15, 16 and 17 is illustrated a car positioning and unloading means that is very effective when conditions are favorable for its use. The standard cradle 50 is used and the car is positioned transversely of the same by two parallel guideways disposed longitudinally of cradle 50. These guideways are each composed of two fixed channel portions as 80 and 81 and a centrally disposed pivoted member 83. These pivoted members are hingedly secured to the cradle at 84 and are disposed for vertical movement within recesses 61 and 62. An operating bar 87 joins these two and is provided with extensions as 88 which in turn provide, on shafts 90, rollers as 91 which are adapted to coact with fixed cams 92.

The mode of using this unloading arrangement is illustrated in one form in Figure 17 in which as the cradle passes the fixed cam 92, the cam serves to raise the free end of guide members 83 so that the automobile "A" will roll off of the cradle onto the receiving ramp 94, energized only by the force of gravity.

When it is stated in the claims that the long upper and lower straight runs extend in generally horizontal directions and that the paths of travel of the chains are elongated in a generally horizontal direction, the term "generally horizontal" means that the directions may deviate from exactly horizontal to the extent necessary or desirable to accommodate the slope of the lot on which the parking device is installed.

It is believed that it will be clearly apparent from the above description and the disclosure in the drawings that the invention comprehends a novel construction of a vehicle parking means.

Having thus disclosed the invention, I claim:

1. An automobile storage device, comprising: a supporting frame rotatably supporting four sprocket wheels arranged in two horizontally separated pairs with the sprocket wheels in each pair juxtaposed to rotate in parallel, spaced-apart, upright planes common to the wheels of the other pair; a pair of endless conveyor chains each supported by two of said sprocket wheels, one on each pair of wheels; the conveyor chains being positioned by the sprocket wheels to follow uniform paths of travel elongated in a generally horizontal direction providing long upper and lower straight runs in a generally horizontal direction each having a length of at least four automobile lengths and providing relatively short ascending and descending curved end runs, the upper and lower runs of the conveyor chains being separated the distance of not over approximately two automobile heights; a series of at least eight platforms each having central trunnion means at each side pivotally connecting them to said conveyor chains whereby the chains support said platforms; each platform being adapted to support a single automobile and having means to retain said automobile thereon; means providing additional support to said chains intermediate said sprocket wheels to prevent sagging of said chains under the weight of said platforms; guide means on said supporting frame engaging with means on said platforms outside of said trunnion means to maintain said platforms in generally horizontal dispositions; power means connected to one pair of sprocket wheels for moving the conveyor chains along their paths of travel, said sprocket wheels being mounted on outwardly extending stub shafts so as to leave the space between the conveyor chains open for the movement of said platforms and automobiles therebetween and the only shaft crossing this space being a power shaft in said power means positioned above the level of the automobile in said lower run and below said upper run, the power shaft keying the power input to each wheel of the pair of sprocket wheels under power so that said conveyor chains will move uniformly together.

2. An automobile storage device, comprising: a supporting frame rotatably supporting four sprocket wheels arranged in two horizontally separated pairs with the sprocket wheels in each pair juxtaposed to rotate in parallel, spaced-apart, upright planes common to the wheels of the other pair; a pair of endless conveyor chains positioned each in one of said planes and each supported by two of said sprocket wheels, one on each pair of wheels; the conveyor chains being positioned by the sprocket wheels to follow uniform paths of travel elongated in a generally horizontal direction providing long upper and lower straight runs in a generally horizontal direction each having a length of a least four automobile lengths and providing relatively short ascending and descending curved end runs, the upper and lower runs of the conveyor chains being separated the distance of not over approximately two automobile heights; a series of at least eight platforms each having central trunnions at each side pivotally connected to said conveyor chains whereby the chains support said platforms; each platform being adapted to support a single automobile and having means to retain said automobile thereon in position to travel in an end forward direction; supporting means providing additional fixed support to said chains intermediate said sprocket wheels to prevent sagging of said chains under the weight of said platforms; guides on said supporting frame engaging with guide engaging means on said platforms outside of said trunnions to maintain said platforms in generally horizontal dispositions; said chains having, at spaced intervals, rollers of a diameter substantially greater than the height of the chains and adapted to position said chains above their supporting means and thereby reduce friction and noise; and power means operative to move said conveyor members together along said paths of travel.

3. The subject matter of claim 2 in which said guides and supporting means include a pair of guideways each forming an annular outline in an upright plane parallel to the planes of said paths of travel, each guideway having in transverse cross-section the form of a channel with inwardly facing flanges and the chains being positioned in the channels, the guide engaging means on said platforms comprising a guide wheel positioned in each corner of each platform disposed to ride in the channels of the guideways to assist in maintaining said platforms in generally horizontal disposition.

4. The subject matter of claim 3 in which said conveyor chains have spaced apart large roller members riding on said flanges supporting the conveyor chains intermediate said sprocket wheels, the flanges of said guideways being recessed adjacent the sprocket wheels permitting the conveyor chains to leave the guideways in their ascending and descending runs, the guideways continuing past said sprocket wheels providing guidance for leading guide wheels in the ascending and descending runs of the platforms.

5. The subject matter of claim 4 in which there is a lever mounted in said supporting frame at each end of the paths of travel of said conveyor chains, the levers being supported to revolve about one end in a plane parallel to the planes of said paths of travel of the chains, said levers having arcuate recesses in their free ends in position to engage the leading guide wheels on said platforms during the ascending and descending end runs and the levers being connected to said power means in a manner timing them to ascend and descend with each platform thereby supporting them in generally horizontal dispositions during the end runs.

6. An automobile storage device, comprising: a supporting frame supporting a pair of juxtaposed flexible endless conveyor members movable in a pair of parallel upright planes in paths of travel having long upper and lower straight runs in a generally horizontal direction each having a length of at least four automobile lengths and providing relatively short ascending and descending end runs; power means operable to move said conveyor members together in said paths of travel; a series of at least eight platforms each having trunnion means at each side connecting them to said conveyor members to be moved thereby; guides on said supporting frame engaging with guide engaging means on said platforms outside of said trunnion means to maintain said platforms in generally horizontal dispositions; wall means on each platform forming a pair of tracks extending from the leading end of the platform to support an automobile thereon to move in an end forward direction, said wall means including side walls extending above a bottom wall disposed to guide the wheels of the automobile in moving on and off said tracks, said bottom wall sloping relative the exact horizontal toward the trailing end of the platform so that automobiles thereon will tend to roll toward the trailing end of the platform and an abutment at the trailing end of the platform to restrain automobiles from moving past the abutment, a section of each platform including said tracks being pivotally connected at one end to the remainder of the platform and said supporting frame having operating means located at one end of one of said straight runs operable to act on the other end of said section to move said section so that said bottom wall slopes relative the exact horizontal toward the leading end of the platform whereby automobiles thereon will tend to roll off the leading end of the platform.

7. The subject matter of claim 6 in which said operating means is automatically operable to move said section by the force of the movement of platforms along their paths of travel to the location of said operating means.

8. The subject matter of claim 7 in which said operating means is a cam on said supporting frame and cam followers on the sections of said platforms.

9. An automobile storage device, comprising: a supporting frame supporting a pair of juxtaposed flexible endless conveyor members movable in a pair of parallel upright planes in paths of travel having long upper and lower straight runs in a generally horizontal direction each having a length of at least four automobile lengths and providing relatively short ascending and descending end runs; power means operable to move said conveyor members together in said paths of travel; a series of at least eight platforms each having trunnion means at each side connecting them to said conveyor members to be moved thereby; guides on said supporting frame engaging with guide engaging means on said platforms outside of said trunnion means to maintain said platforms in generally horizontal dispositions; wall means on each platform forming a pair of tracks extending from the leading end of the platform to support an automobile thereon to move in an end forward direction, said wall means including side walls extending above a bottom wall disposed to guide the wheels of the automobile in moving on and off said tracks, said bottom wall sloping relative the exact horizontal toward the trailing end of the platform so that automobiles thereon will tend to roll toward the trailing end of the platform, an abutment at the trailing end of the platform to restrain automobiles from moving past the abutment, and in which a section of each platform including said tracks is pivotally secured at one end to the remainder of the platform and power driven means acting between the other end of the section and the remainder of the platform operable to move said section so that said bottom wall slopes relative the exact horizontal toward the leading end of the platform whereby automobiles thereon will tend to roll off the leading end of the platform.

References Cited in the file of this patent

UNITED STATES PATENTS

| | | |
|---|---|---|
| 1,288,567 | Hall | Dec. 24, 1918 |
| 1,771,022 | Wachs et al. | July 22, 1930 |
| 1,865,596 | Starks | July 5, 1932 |
| 1,871,372 | James | Aug. 9, 1932 |
| 1,925,442 | Fournier | Sept. 5, 1933 |
| 2,216,972 | Gibson et al. | Oct. 8, 1940 |
| 2,509,388 | Biszantz | May 30, 1950 |
| 2,512,356 | Massiello | June 20, 1950 |
| 2,670,860 | Cogings | Mar. 2, 1954 |

FOREIGN PATENTS

| | | |
|---|---|---|
| 247,503 | Great Britain | Feb. 15, 1926 |
| 436,107 | Germany | Oct. 26, 1926 |
| 681,892 | France | Feb. 4, 1930 |
| 353,900 | Great Britain | July 27, 1931 |